United States Patent Office 3,419,556
Patented Dec. 31, 1968

3,419,556
PRODUCTION OF CYANOMELAMINE
Siegfried Wolfram Schubert and Johann L. Makart, Visp, Switzerland, assignors to Lonza Ltd., Gampel (Canton of Valais), Basel, Switzerland
No Drawing. Filed Oct. 1, 1965, Ser. No. 492,308
Claims priority, application Switzerland, Oct. 6, 1964, 12,920/64
3 Claims. (Cl. 260—249.6)

ABSTRACT OF THE DISCLOSURE

Tetrameric cyanogen halide is reacted with an excess of aqueous ammonia solution to replace the N=C(Hal)$_2$ group by a NH—C≡N group whereby also all the other halogen atoms are replaced by NH$_2$ groups.

---

This invention relates to certain derivatives of 1,3,5-triazines and their method of preparation.

U.S. Patent No. 3,053,843 discloses a process to replace in tetrameric cyanogen halides of the formula

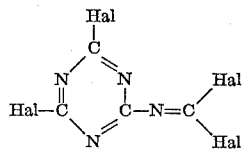

wherein Hal is halogen, at least one or also all four halogen atoms by a substituted amino group to form condensation products of the general formula

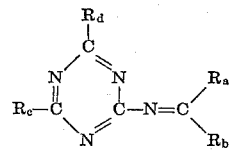

wherein R$_a$ represents a substituted amino group and R$_b$, R$_c$, R$_d$ represent halogen or R$_a$.

According to that disclosure, it should have been expected that by reaction of tetrameric cyanogen halides with ammonia, 1,3,5-triazine derivatives would be obtained in which one or both halogen atoms of the side chain would be replaced by the NH$_2$ group, and halogen atoms of the ring would be also replaced by NH$_2$ groups, according to the reaction conditions.

In contrast to this expected reaction, we have found that when tetrameric cyanogen halides are reacted with aqueous ammonia solutions in neutral to ammoniacal medium, there is not the expected exchange of one or both halogen atoms of the side chain against one NH$_2$ group each; rather, the ammonia reacts simultaneously with both halogen atoms of the side chain to form, depending on the temperature and reaction conditions, a carbodiimino or a carbamonitrile group. Under said conditions, the reaction product is a derivative of 1,3,5-triazine of the general formula

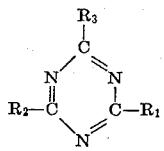

wherein R$_1$ is a —N=C=NH or —NH—C≡N group, and R$_2$ and R$_3$ represent a halogen atom or an NH$_2$ group.

As tetrameric cyanogen halide, we prefer to use tetrameric cyanogen chloride.

In the reaction, a neutral reaction medium can be provided by starting with the tetrameric cyanogen halide and adjusting the addition of the aqueous ammonia to the rate of actual Cl replacement.

The carbodiimino and the carbamonitrile group are tautomeric forms. In accordance with the reaction conditions, the equilibrium is shifted to the one or other side, and either the carbodiimino or the carbamonitrile group will be obtained.

If the reaction conditions are so chosen that none, or only one, of the nuclear halogen atoms is replaced by an NH$_2$ group, then the carbodiimino compound is obtained. If, however, both nuclear halogen atoms are replaced by NH$_2$ groups, the carbamonitrile compound is formed. It appears, therefore, that the halogen or NH$_2$ groups of the ring control the formation of the one or other form and stabilize the same.

The reactivity of the four halogen atoms of the tetrameric cyanogen halides is different. Most readily react the two halogen atoms of the side chain. Next reacts a halogen of the nucleus, whereby the replacement can still be carried out at lower temperatures. If also the second halogen of the nucleus is to be replaced by the NH$_2$ group, higher temperatures must be applied.

Carbodiimino triazines are obtained when tetrameric cyanogen halides are reacted either with ammonia in stoichiometric amounts, calculated on the halogen atoms to be replaced, at temperatures in the range of below 0° C. to about 60° C., or with an excess of ammonia at low temperatures up to about room temperature. In the former case, the reaction can be directed by the chosen amount of ammonia in such a manner that the nuclear halogen atoms remain unchanged, or that only one thereof is exchanged against NH$_2$. In the latter case, there is always the exchange of one nuclear halogen atom. When stoichiometric amounts of ammonia, e.g. calculated for the two halogen atoms of the side chain and one nuclear halogen, are used and the temperature is raised above about 60° C., the other nuclear halogen atom can be replaced by the OH group.

The carbamonitrilotriazine is obtained when both nuclear halogen atoms are replaced by the NH$_2$ group. This can be effected by employing an excess of ammonia and elevated temperatures, for instance in the range of about 30 to 90° C.

The carbodiimino-1,3,5-triazines produced by our process have not been known. The known 2,4-diamino-6-carbamonitrilo-1,3,5-triazine could be obtained from dicyanodiamide, i.e. by building up the triazine ring.

The following examples are given to illustrate the invention.

Example 1

25 g. of tetrameric cyanogen chloride were cooled to 0° C. and added to a cooled mixture of 125 ml. of 25% aqueous ammonia and 125 ml. of water with vigorous stirring and further cooling in an ice bath. During the reaction, the temperature rose to 18° C., and the tetrameric cyanogen chloride was completely dissolved. On cooling, fine crystals formed in increasing amounts, which soon settled and could be readily filtered. Subsequently, the crystals were dried in vacuo.

The elementary analysis for the formula C$_4$H$_3$ClN$_6$ gave the following values:

Found: 27.5% C; 2.1% H; 19.5% Cl; 49.3% N. Calculated: 28.2% C; 1.8% H; 20.3% Cl; 48.0% N.

In accordance with the reaction and the I.R. spectrogram, the new compound corresponds to the following structural formula

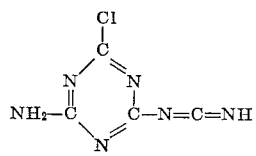

2-chloro-4-amino-6-carbodiimino-s-triazine was also obtained by reaction of tetrameric cyanogen chloride with concentrated aqueous ammonia (25%) at 0° C. Under these conditions, however, a very fine crystal powder was obtained which was difficult to filter.

Example 2

12.5 g. (0.05 mol) of tetrameric cyanogen chloride were cooled to —5° C. and added with shaking to a solution of 13 ml. of concentrated ammonia (0.16 mol) and 17 ml. of water, also cooled to —5° C. A crystalline sludge was formed, which, after addition of 25 ml. 2 N HCl, was immediately sucked off and washed with ice water.

The elementary analysis for the formula $C_4HCl_2N_5$ gave the following values:

Found: 24.8% C; 0.8% H; 37.6% Cl; 36.8% N. Calculated: 25.3% C; 0.53% H; 37.2% Cl; 37.1% N.

According to the I.R. spectrogram, the compound has the structural formula

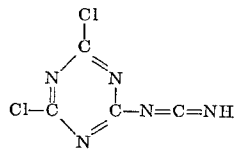

Example 3

6.1 g. of tetrameric cyanogen chloride were cooled to 0° C. A 25% aqueous ammonia solution was slowly added through a dropping funnel, and after addition of 250 ml. of said solution, the mixture was heated to the boiling point and refluxed. The originally formed white crystal mass dissolved. Boiling was continued for 4 hours with continual addition of small amounts of concentrated ammonia solution. After cooling, the solution remained clear. Then the solution was acidified with dilute hydrochloric acid; a thick white precipitate formed, which was filtered and dried in vacuo. The yield was 95%.

The elementary analysis for the formula $C_4H_5N_7$ gave the following values:

Found: 31.2% C; 3.5% H; 0% Cl; 62.5% N. Calculated: 31.8% C; 3.33% H; 0% Cl; 64.8% N.

According to the I.R. spectrogram, the compound has the structural formula

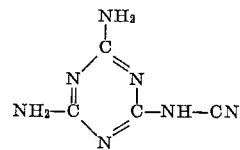

It is 2,4-diamino-6-carbamonitrilo-s-triazine, which has been synthesized from dicyanodiamide and gives with ammoniacal copper sulfate solution of specific red-violet precipitate.

The products obtained by this process are condensation products which can be used in many ways, for example for the production of dyeings, as agricultural chemicals and for the production of textile auxiliary products.

We claim:

1. A process for the preparation of 1,3,5-triazine derivatives of the formula

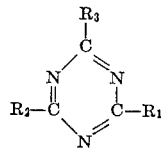

wherein $R_1$ is —NH—C≡N and $R_2$ and $R_3$ are $NH_2$, said process comprising reacting tetrameric cyanogen halide with excess of an aqueous ammonia solution, calculated on the halogen atoms of the cyanogen halide, at a temperature of 30° to 90° C.

2. The process as claimed in claim 1 comprising reacting tetrameric cyanogen chloride with an aqueous ammonia solution.

3. The process as claimed in claim 1 comprising reacting tetrameric cyanogen halide with an aqueous ammonia solution with an ammonia content between 10 to 30 percent by weight.

References Cited

UNITED STATES PATENTS

| | | | |
|---|---|---|---|
| 2,510,981 | 6/1950 | Kaiser et al. | 260—249.6 |
| 2,537,834 | 1/1951 | Kaiser et al. | 260—249.6 |
| 3,053,843 | 9/1962 | Gysin et al. | 260—249.5 |
| 3,137,694 | 6/1964 | Riethmann et al. | 260—249.5 |
| 3,152,127 | 10/1964 | Sallmann et al. | 260—249.5 |

OTHER REFERENCES

Bieling et al.: J. Prakt. Chemie, 4th series, vol. 28, pp. 325–40 (1965).

HENRY R. JILES, *Primary Examiner.*

J. M. FORD, *Assistant Examiner.*

U.S. Cl. X.R.

260—249.5, 249.8